(12) United States Patent
Raffelsberger (10) Patent No.: US 7,994,665 B2
(45) Date of Patent: Aug. 9, 2011

(54) ENGINE ELECTRICAL GENERATOR COOLING DEVICE AND METHOD

(75) Inventor: Patrick Raffelsberger, Hofkirchen im Traunkreis (AT)

(73) Assignee: BRP-Powertrain GmbH & Co. KG, Gunskirchen (AT)

( * ) Notice: Subject to any disclaimer, the term of this patent is extended or adjusted under 35 U.S.C. 154(b) by 999 days.

(21) Appl. No.: 11/849,014

(22) Filed: Aug. 31, 2007

(65) Prior Publication Data

US 2009/0057433 A1    Mar. 5, 2009

(51) Int. Cl.
*H02K 9/00* (2006.01)
*H02K 9/20* (2006.01)
*H02K 9/26* (2006.01)
*H02K 9/08* (2006.01)
*H02K 15/00* (2006.01)
*H02K 15/02* (2006.01)

(52) U.S. Cl. ............. 310/61; 310/54; 310/55; 310/56; 310/57; 310/58; 310/59; 29/596; 29/598

(58) Field of Classification Search .............. 310/54–61; 29/596, 598
See application file for complete search history.

(56) References Cited

U.S. PATENT DOCUMENTS

| | | | |
|---|---|---|---|
| 2,987,637 A * | 6/1961 | Bertsche et al. | 310/54 |
| 6,424,065 B1 | 7/2002 | Vlemmings et al. | |
| 7,061,148 B2 | 6/2006 | Philippart | |
| 2006/0260577 A1 * | 11/2006 | Suga et al. | 123/90.17 |
| 2007/0200439 A1 | 8/2007 | Nagahashi et al. | |

OTHER PUBLICATIONS

International Search Report from PCT/US2008/074960; Lee W. Young; Nov. 18, 2008.

\* cited by examiner

*Primary Examiner* — Quyen Leung
*Assistant Examiner* — Jose A Gonzalez Quinones
(74) *Attorney, Agent, or Firm* — Osler, Hoskin & Harcourt LLP (57) ABSTRACT

A rotor for an electrical generator is disclosed, including a rotor body having a circular portion and a cylindrical portion coaxial with the circular portion. A generally cylindrical recess is defined by the cylindrical portion and the first side of the circular portion for receiving a stator. At least one first wall is at least partially spaced apart from the first side of the circular portion, defining at least one chamber therebetween. The chamber has an inlet. An aperture in the at least one first wall defines an outlet of the at least one chamber. At least one second wall extends outwardly from the first side of the circular portion. The at least one second wall has an end portion adjacent to the inlet of the at least one chamber. An internal combustion engine with an electrical generator and a method of cooling an electrical generator are also disclosed.

7 Claims, 11 Drawing Sheets

ENGINE ELECTRICAL GENERATOR COOLING DEVICE AND METHOD

FIELD OF THE INVENTION

The present invention relates to a device and method for cooling for an electrical generator of an engine.

BACKGROUND OF THE INVENTION

Many internal combustion engines include an electrical generator driven by the engine to generate electrical power. The power generated by the generator can be used to power some engine systems (for example, the ignition and fuel injection systems), and some systems external to the engine (for example, lights and display gauges of a vehicle powered by the engine).

A typical generator for an internal combustion engine has a rotor portion and a stator portion. The rotor includes a plurality of permanent magnets which generate a magnetic field and the stator includes one or more wire coils. The rotor is powered by the engine and is thereby caused to spin with respect to the stator. The relative motion of the magnets and the wire coils induces an electric current in the wire coils. The current can then be transmitted to the various electrical systems that are powered by the generator.

The power output of the generator is typically determined by the internal structure of the generator, such as the arrangement of the magnets and coils, as well as by the rotational speed of the rotor. Thus, although the power consumption of the various electrical systems varies over time, the amount of power produced by the generator at a particular time cannot be conveniently adjusted to correspond to the varying levels of power consumption. Thus, the generator is typically designed to always produce sufficient electrical power to meet the needs of the electrical systems under all operating conditions, to ensure their continuous operation. When the actual power consumption of the electrical systems is less than the power produced by the generator, as is usually the case, the excess power is dissipated by the generator coils, in the form of heat. Thus, cooling must be provided for the generator coils.

One method of cooling the generator coils is to spray them with a coolant, such as oil from the lubrication system of the engine. When the generator coils are in contact with the coolant, they will transfer a portion of their heat to the coolant. The coolant is subsequently transported to a heat exchanger to dissipate the heat into the environment. While this method is effective in cooling the generator coils, it suffers from a number of drawbacks. Because the rotor and stator are located in a confined space, and because the rotor is spinning, it is difficult to provide sufficient coolant to adequately cool the generator coils. In addition, particularly at low speeds, the rotation of the rotor does not adequately distribute the coolant within the generator to cool every part of the generator coils.

Therefore, there is a need for a way of cooling an electrical generator.

SUMMARY OF THE INVENTION

It is an object of the present invention to ameliorate at least some of the inconveniences present in the prior art.

It is also an object of the present invention to cool a stator of an electrical generator by using a flow of coolant fluid between the rotor and the stator of an electrical generator.

In one aspect, the invention provides a rotor for an electrical generator, comprising a rotor body. The rotor body has a circular portion having a first side and a second side opposite the first side, and a cylindrical portion coaxial with the circular portion. The cylindrical portion extends from the first side of the circular portion. The circular portion and the cylindrical portion define a longitudinal axis of the rotor body. A plurality of permanent magnets are disposed on the cylindrical portion. A generally cylindrical recess is defined by the cylindrical portion and the first side of the circular portion for receiving a stator. At least one first wall is at least partially spaced apart from the first side of the circular portion. The at least one first wall and the first side of the cylindrical portion define at least in part at least one chamber therebetween. The at least one chamber has an inlet. An aperture in the at least one first wall defines an outlet of the at least one chamber. At least one second wall extends outwardly from the first side of the circular portion. The at least one second wall has an end portion adjacent to the inlet of the at least one chamber.

In a further aspect, the at least one chamber is a plurality of chambers. The at least one second wall is a plurality of second walls.

In a further aspect, the at least one chamber is three chambers.

In a further aspect, the end portion of each of the plurality of second walls is a first end portion adjacent to a first chamber of the plurality of chambers. Each of the plurality of second walls has a second end portion adjacent to a second chamber of the plurality of chambers.

In a further aspect, the inlet of the at least one chamber faces toward the longitudinal axis.

In a further aspect, at least one third wall is adjacent to the at least one second wall. The at least one third wall has a portion extending generally parallel to, and spaced apart from, the first side of the circular portion.

In an additional aspect, the invention provides an internal combustion engine having a crankcase. A crankshaft is disposed in the crankcase. At least one cylinder is connected to the crankcase. At least one piston is disposed in the at least one cylinder and operatively connected to the crankshaft. A generator is operatively coupled to the crankshaft. The generator comprises a stator fixedly mounted to the internal combustion engine. The stator comprises at least one wire coil. The generator comprises a rotor powered by the crankshaft. The rotor comprises a rotor body. The rotor body has a circular portion and a cylindrical portion. The circular portion has a first side and a second side opposite the first side. The cylindrical portion extends from the first side of the circular portion. The circular portion and the cylindrical portion define a longitudinal axis of the rotor body. A plurality of permanent magnets are disposed on the cylindrical portion. A generally cylindrical recess is defined by the cylindrical portion and the first side of the circular portion for receiving the stator. At least one first wall is at least partially spaced apart from the first side of the circular portion. The at least one first wall and the first side of the cylindrical portion define at least in part a chamber therebetween. The chamber having an inlet. An aperture in the at least one first wall defines an outlet of the chamber. At least one second wall extends outwardly from the first side of the circular portion. The at least one second wall has an end portion adjacent to the inlet of the at least one chamber.

In a further aspect, the at least one chamber is a plurality of chambers, and wherein the at least one second wall is a plurality of second walls.

In a further aspect, the at least one chamber is three chambers.

In a further aspect, the end portion of each of the plurality of second walls is a first end portion adjacent to a first chamber of the plurality of chambers. Each of the plurality of second walls has a second end portion adjacent to a second chamber of the plurality of chambers.

In a further aspect, the inlet of the at least one chamber faces toward the longitudinal axis.

In a further aspect, at least one third wall is adjacent to the at least one second wall. The at least one third wall has a portion extending generally parallel to, and spaced apart from, the first side of the circular portion.

In a further aspect, the stator further comprises a passage extending therethrough. The passage is generally parallel to, and spaced apart from, the longitudinal axis of the rotor body.

In an additional aspect, the invention provides a method of cooling a generator comprising a stator having at least one wire coil, and a rotor body. The rotor body has a circular portion having a first side and a second side opposite the first side. A cylindrical portion is coaxial with the circular portion. The cylindrical portion extends from the first side of the circular portion. The circular portion and the cylindrical portion define a longitudinal axis of the rotor body. The method comprises: providing a flow of coolant through the stator; supplying the coolant to the first side of the circular portion of the rotor body; causing the coolant to move radially along the first side of the circular portion, outwardly from the longitudinal axis; collecting the coolant in at least one chamber adjacent to the first side of the circular portion; and expelling the coolant from the at least one chamber generally in the direction of the stator.

In a further aspect, collecting the coolant in at least one chamber comprises collecting the coolant in a plurality of chambers.

In a further aspect, collecting the coolant in at least one chamber comprises collecting the coolant in three chambers.

In a further aspect, the coolant is oil. Providing a flow of coolant through the stator comprises providing a flow of oil through the stator from an oil circulation system of an internal combustion engine.

In a further aspect, the method comprises returning the oil to an oil tank of the internal combustion engine.

In a further aspect, causing the coolant to move radially along the first side of the circular portion, outwardly from the longitudinal axis comprises: causing the coolant to move radially along the first side of the circular portion, outwardly from the longitudinal axis, to at least one wall; causing the coolant to move generally tangentially along the at least one wall toward an inlet of the at least one chamber; and causing the coolant to move radially outwardly into the at least one chamber.

For the purposes of this application, the terms "radial", "axial" and "tangential" are defined with respect to the axis of rotation of the rotor. Thus, "radial" refers to a direction toward or away from the axis of rotation, "axial" refers to a direction along or parallel to the axis of rotation, and "tangential" refers to a direction perpendicular to the radial direction but not along the axial direction.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

An electrical generator in accordance with embodiments of the present invention will be described with respect to its use in an internal combustion engine. It should be understood that an internal combustion engine incorporating an electrical generator according to the present invention is suitable for use in many different types of vehicles, including snowmobiles, personal watercraft, ATVs, motorcycles and three-wheeled motorized vehicles. It is contemplated that the present invention could also be used in an alternator.

Figure 1:
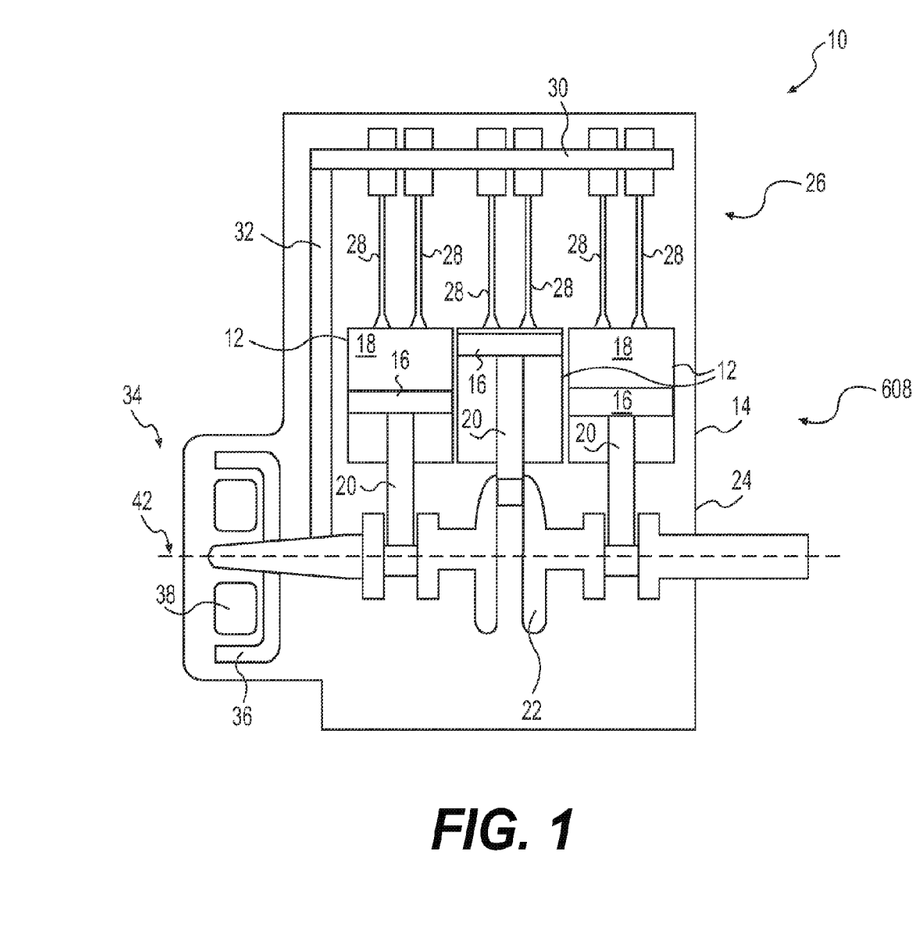
FIG. 1 is a cross-section of an internal combustion engine taken vertically through a longitudinal centerline thereof.
Figure 2:
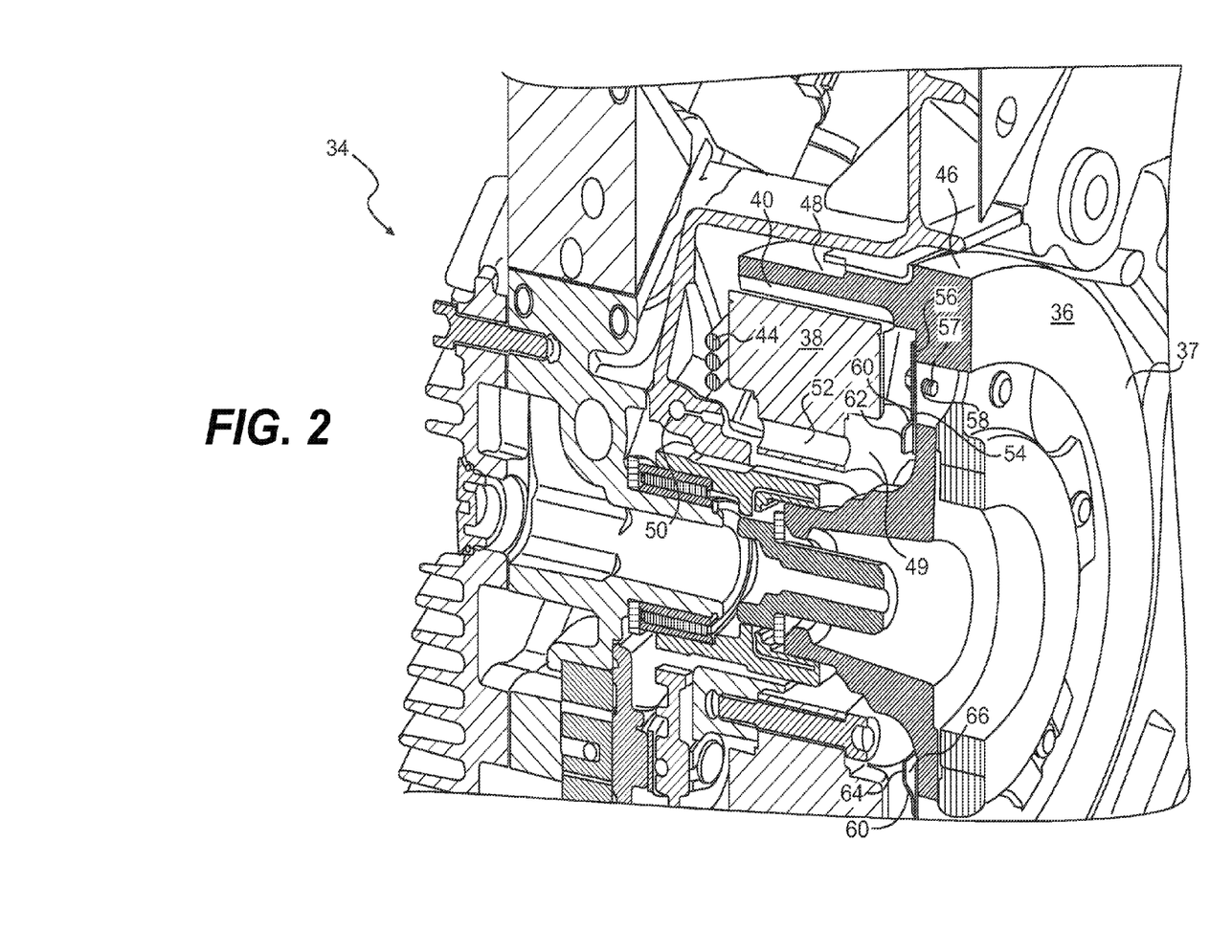
FIG. 2 is a cross-sectional view of an electrical generator and adjoining engine components according to an embodiment of the present invention.

Referring to FIGS. 1 and 2, a four-stroke internal combustion engine 10 has three cylinders 12 contained in a cylinder bank 14. Each cylinder 12 has a piston 16 associated therewith. Each piston 16 can reciprocate within its respective cylinder 12 to change the volume of a combustion chamber 18 associated with the cylinder. Each piston 16 is coupled via a control rod 20 to a crankshaft 22 journaled in a crankcase 24, such that combustion of fuel (not shown) in the combustion chambers 18 forces the pistons 16 downward to cause rotation of the crankshaft 22. A number of valves 28 are provided for each cylinder 12, some of which allow fuel to enter the combustion chambers 18 for combustion therein, and others of which allow exhaust gases (not shown) to exit the combustion chambers 18 after combustion has occurred. The opening and closing of the valves 28 is controlled by a camshaft 30, which is driven by the crankshaft 22 via a chain 32. Alternative valve control systems are also contemplated, such as electronically actuated valves. It should be understood that the present invention is not limited to the particular engine 10 described, and can be practiced with a variety of other engine types, including engines with more or fewer cylinders, V-type engines with cylinders arranged in two cylinder banks, two-stroke engines and other variations that will be apparent to a person skilled in the art.

The crankshaft 22 is coupled to a rotor 36 of a generator 34. The rotor 36 has a rotor body 37 having a number of permanent magnets 40 (best seen in FIG. 2) mounted thereon, such that rotation of the crankshaft 22 causes the rotor 36 to rotate about the axis 42. Referring to FIG. 2, the rotor body 37 is composed of a circular portion 46 that is attached at its center to the crankshaft 22, and a cylindrical portion 48 on which the permanent magnets 40 are mounted. The circular portion 46 and the cylindrical portion 48 together define a cylindrical recess 49 for receiving the stator 38, and also define a longitudinal axis coaxial with the axis of rotation 42. When the engine 10 is in operation, the rotation of the crankshaft 22 causes the rotor 36 to rotate about the axis 42 around the stator 38.

The stator 38, comprising one or more coils of wire 44 (best seen in FIG. 2), is fixed in position inside the cylindrical recess 49, such that the rotation of the permanent magnets 40 induces an electrical current in the coils of wire 44. The electrical current is conducted from the generator 34 to provide power to one or more systems or devices (not shown) that require electrical power, such as the electrical systems of the engine 10 and the electrical systems of the vehicle (not shown) in which the engine 10 is used. For example, the engine 10 may have one or more of an electrical ignition system, an electrical fuel injection system or an electronic valve actuation system. The engine 10 may be used in a vehicle (not shown) having lights, display gauges or a rechargeable battery. It is contemplated that not all of these systems will be present in a particular engine 10 or vehicle, or that not all of these systems will require electrical power in a particular engine 10 or vehicle. For example, the engine 10 may have a carburetor instead of an electronic fuel injection system, or a fuel injection system driven mechanically by the engine 10. It is further contemplated that the generator 34 may power any other electrical system that forms part of the engine 10 or the vehicle in which the engine is used, as needed. It is further contemplated that the generator 34 could power any other system or device that requires electricity.

While the engine 10 is in operation, excess power is generated by the generator 34, and this excess power is dissipated as heat in the coils 44. In order to reduce the heat build-up in the coils 44, the rotor body 37 includes a catch plate 54 to assist in cooling the stator 38, as will be described in further detail below. Referring to FIG. 2, the catch plate 54 is mounted to the circular portion 46 of the rotor body 37 within the cylindrical recess 49. It is contemplated that the catch plate 54 can alternatively be mounted to the circular portion 46 by any other suitable means, such as welding. It is further contemplated that the catch plate 54 may be constructed integrally with the rotor body 37 in a one-piece construction.

Figure 3:
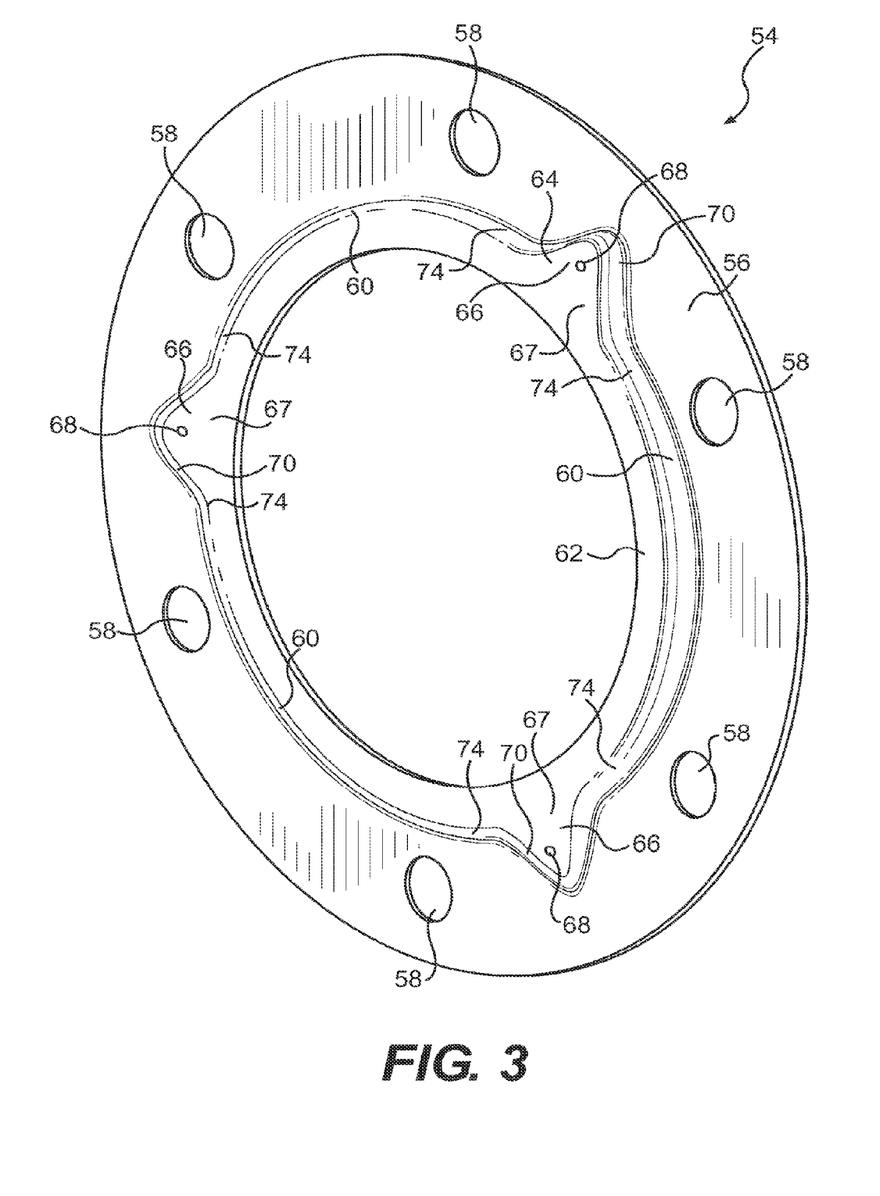
FIG. 3 is a perspective view of a catch plate according to a first embodiment of the present invention.

Referring to FIG. 3, the catch plate 54 will now be described according to a first embodiment of the present invention. The catch plate 54 is made of stamped sheet metal, and has a planar attachment flange 56 with a plurality of holes 58 formed therein, to allow the catch plate 54 to be mounted to the inside of the circular portion 46 of the rotor body 37 using bolts 57, one of which can be seen in FIG. 2. As can be seen in FIGS. 2 and 3, the wall 60 extends away from the plane of the attachment flange 56, and thus extends away from the circular portion 46 of the rotor body 37 when the catch plate 54 is mounted on the rotor body 37. The wall 62 extends radially inwardly from the edge of the wall 60, and generally parallel to the circular portion 46 of the rotor body 37 when the catch plate 54 is mounted to the rotor body 37. Three walls 70 extend radially outwardly from the end portions 74 of the walls 60, and cooperate with the walls 64 and the circular portion 46 of the rotor body 37 to define three chambers 66. Each chamber has an inlet 67 adjacent to the end portions 74 and facing toward the axis 42. It is contemplated that the catch plate 54 may have more or fewer than three chambers 66 and still be within the scope of the invention. An aperture 68 is provided in each wall 64 to serve as an outlet for the chamber 66. It is contemplated that more than one aperture 68 may be provided in each wall 64. The function of the catch plate 54 to deliver coolant to the stator 38 will be described in further detail below.

Figure 4:
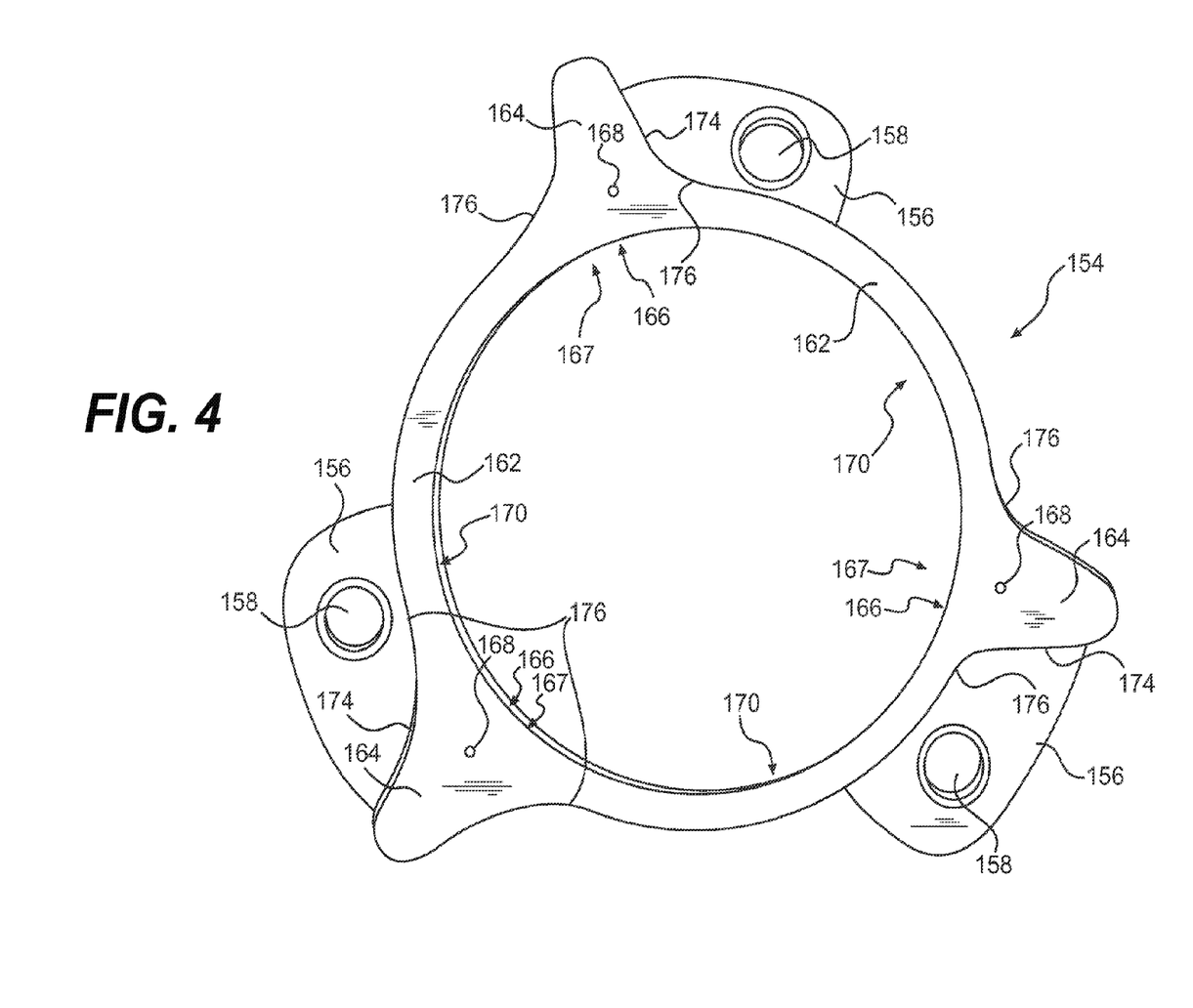
FIG. 4 is an elevation view of one side of a catch plate according to a second embodiment of the present invention.
Figure 5:
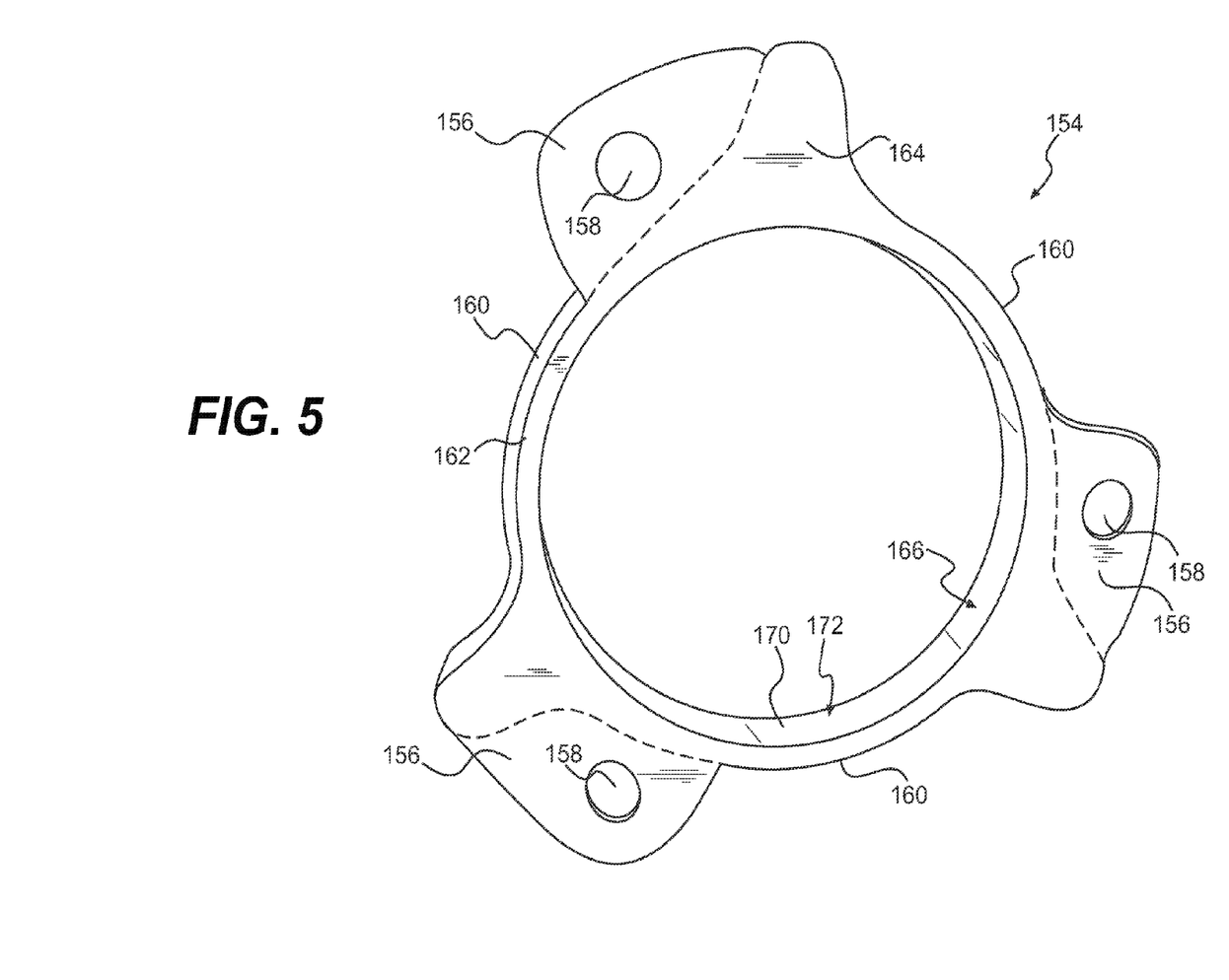
FIG. 5 is a perspective view of the second side of the catch plate of FIG. 4.

Referring to FIGS. 4 and 5, the catch plate 154 will now be described according to a second embodiment of the present invention. The catch plate 154 is made of welded or cast metal, or moulded plastic, and has a plurality of planar attachment flanges 156. Each attachment flange 156 has a hole 158 formed therein, to allow the catch plate 154 to be mounted to the inside of the circular portion 46 of the rotor body 37 using bolts 57, one of which can be seen in FIG. 2. As can be seen in FIGS. 4 and 5, the wall 160 extends away from the plane of the attachment flanges 156, and thus also extends away from the circular portion 46 of the rotor body 37 when the catch plate 154 is mounted on the rotor body 37. The walls 162 and 170 extend radially inwardly from the edge of the wall 160 to define a channel 172. Three walls 174 extend radially outwardly from the end portions 176 of the walls 160, and cooperate with the walls 164, 170 to define three chambers 166. Each chamber 166 has an inlet 167 adjacent to the end portions 176 and facing toward the axis 42. It is contemplated that the catch plate 154 may have more or fewer than three chambers 166 and still be within the scope of the invention. An aperture 168 is provided in each wall 164 to serve as an outlet for the chamber 166. It is contemplated that more than one aperture 168 may be provided in each wall 164. The function of the catch plate 154 will be described in further detail below.

Figure 6:
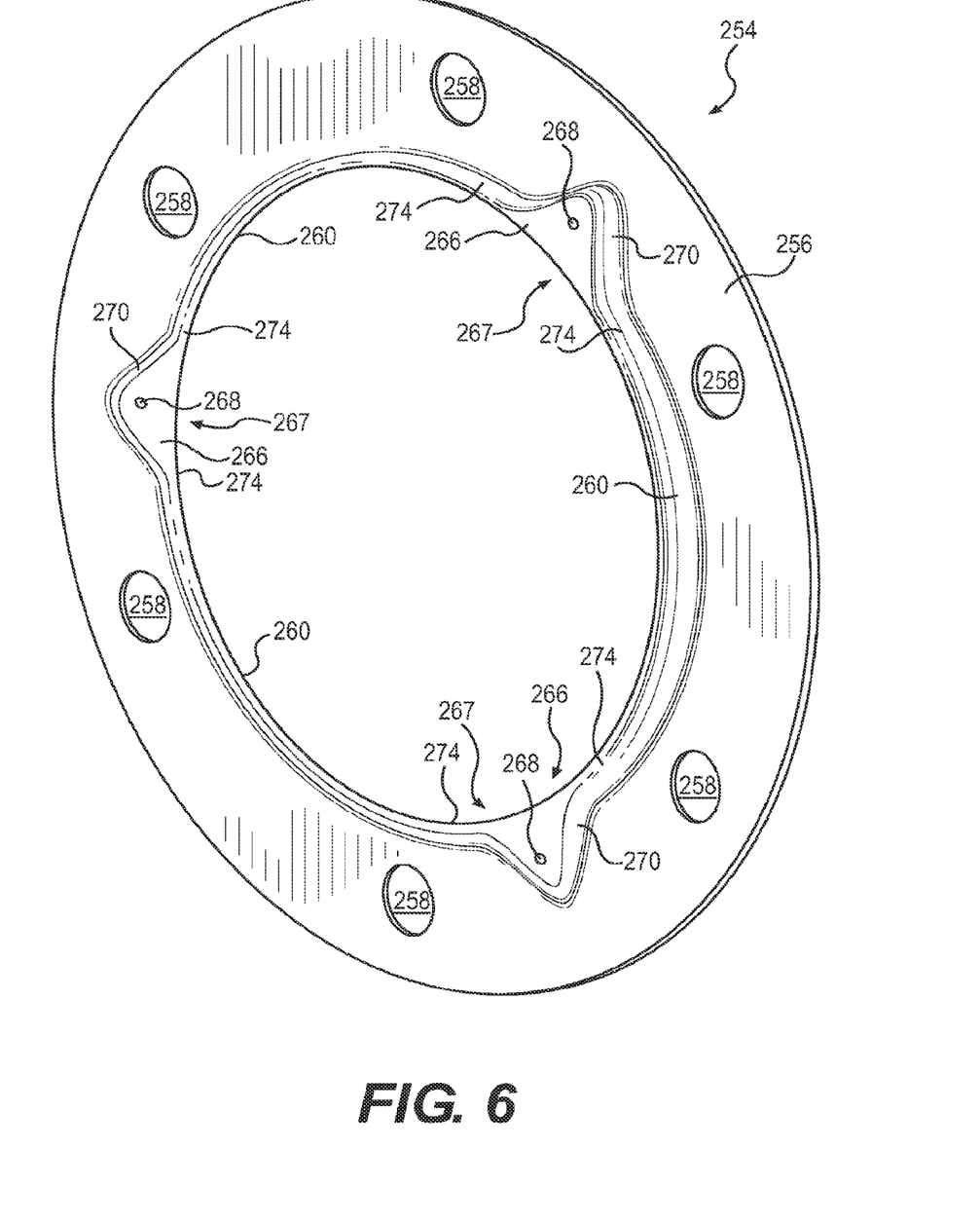
FIG. 6 is a perspective view of a catch plate according to a third embodiment of the present invention.

Referring to FIG. 6, the catch plate 254 will now be described according to a third embodiment of the present invention. The catch plate 254 is made of stamped sheet metal, and has a planar attachment flange 256 with a plurality of holes 258 formed therein, to allow the catch plate 254 to be bolted to the inside of the circular portion 46 of the rotor body 37 as can be seen in FIG. 2. As can be seen in FIG. 6, the wall 260 extends away from the plane of the attachment flange 256, and also extends away from the circular portion 46 of the rotor body 37 when the catch plate 254 is mounted on the rotor body 37. Three walls 270 extend radially outwardly from the end portions 274 of the walls 260, and cooperate with the walls 264 and the circular portion 46 of the rotor body 37 to define three chambers 266. Each chamber 266 has an inlet 267 adjacent to the end portions 274 and facing toward the axis 42. It is contemplated that the catch plate 254 may have more or fewer than three chambers 266 and still be within the scope of the invention. An aperture 268 is provided in each wall 264 to serve as an outlet for the chamber 266. It is contemplated that more than one aperture 268 may be provided in each wall 264. The function of the catch plate 254 will be described in further detail below.

Figure 7:
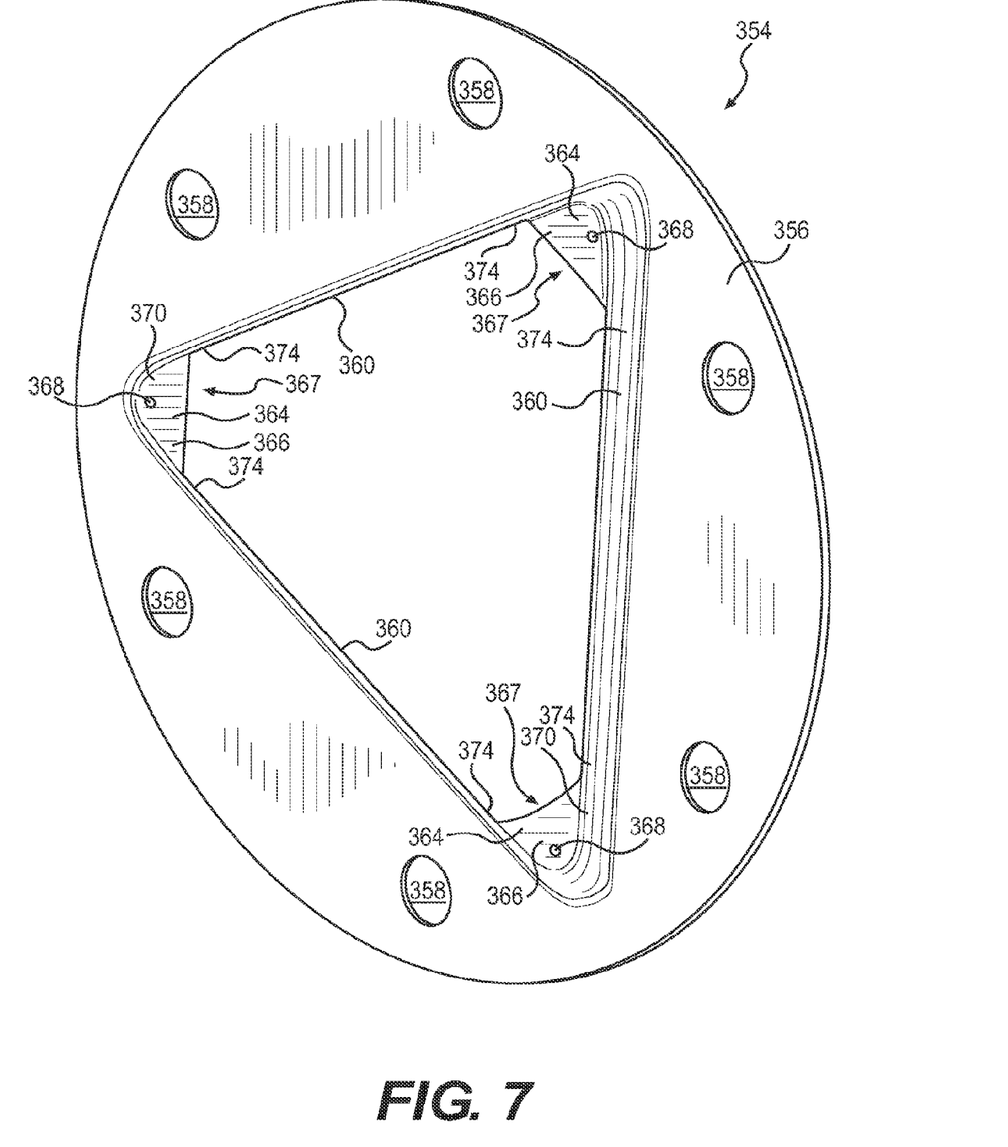
FIG. 7 is a perspective view of a catch plate according to a fourth embodiment of the present invention.

Referring to FIG. 7, the catch plate 354 will now be described according to a fourth embodiment of the present invention. The catch plate 354 is made of stamped sheet metal, and has a planar attachment flange 356 with a plurality of holes 358 formed therein, to allow the catch plate 354 to be mounted to the inside of the circular portion 46 of the rotor body 37 using bolts 57, one of which can be seen in FIG. 2. As can be seen in FIG. 7, the wall 360 extends away from the plane of the attachment flange 356, and thus also extends away from the circular portion 46 of the rotor body 37 when the catch plate 354 is mounted on the rotor body 37. In this embodiment, the wall 360 is composed of a number of straight portions, as opposed to the arcuate walls shown in the embodiments of FIGS. 3-6. Three walls 370 extend radially outwardly from the end portions 374 of the walls 360, and cooperate with the walls 364 and the circular portion 46 of the rotor body 37 to define three chambers 366. Each chamber 366 has an inlet 367 adjacent to the end portions 374 and facing toward the axis 42. It is contemplated that the catch plate 354 may have more or fewer than three chambers 366 and still be within the scope of the invention. An aperture 368 is provided in each wall 364 to serve as an outlet for the chamber 366. It is contemplated that more than one aperture 368 may be provided in each wall 364. The function of the catch plate 354 will be described in further detail below.

Figure 8:
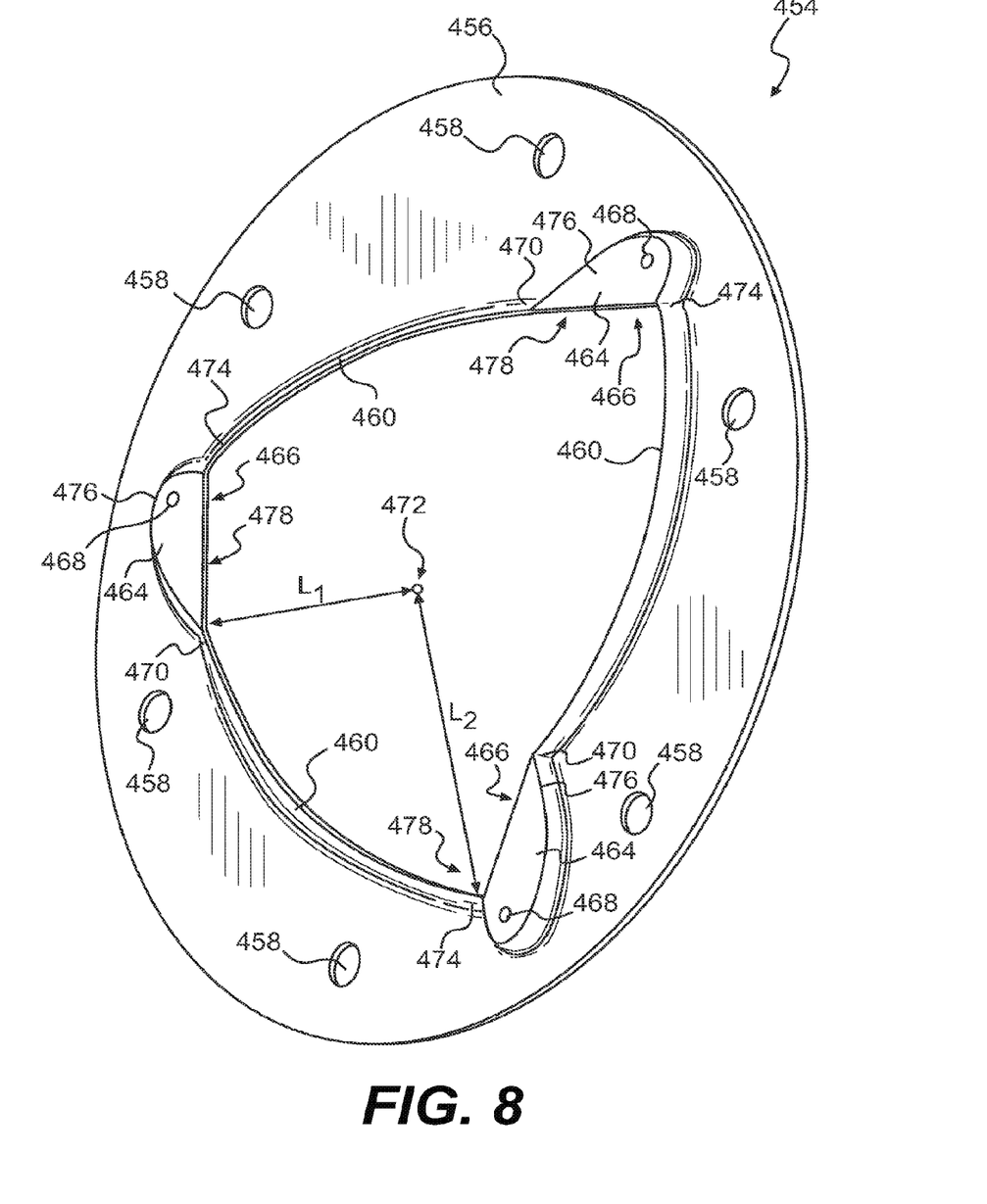
FIG. 8 is an elevation view of a catch plate according to a fifth embodiment of the present invention.

Referring to FIG. 8, the catch plate 454 will now be described according to a fifth embodiment of the present invention. The catch plate 454 is made of stamped sheet metal, and has a planar attachment flange 456 with a plurality of holes 458 formed therein, to allow the catch plate 454 to be mounted to the inside of the circular portion 46 of the rotor body 37 using bolts 57, one of which can be seen in FIG. 2. The catch plate 454 is mounted on the rotor body 37 such that the geometric center 472 of the catch plate 454 lies on the axis 42. As can be seen in FIG. 8, the wall 460 extends away from the plane of the attachment flange 456, and thus also extends away from the circular portion 46 of the rotor body 37 when the catch plate 454 is mounted on the rotor body 37. Three walls 476 extend radially outwardly from the end portions 470 and 474 of the walls 460, and cooperate with the walls 464 and the circular portion 46 of the rotor body 37 to define three chambers 466. In the present embodiment, the walls 460 between the chambers 466 each have a first end portion 470 at a first distance L1 from the center 472 and a second end portion 474 at a second distance L2 from the center 472. The distance L2 is greater than the distance L1. The walls 460 gradually increase in distance from the center 472 between the first end 470 and the second end 474. This particular shape assists in guiding coolant along the portion of the wall 460 in the direction of the second end portion 474 and into the chambers 466 via the inlets 476 when the coolant is subjected to centrifugal force when the catch plate 454 spins in the clockwise direction, as will be described in further detail below. The inlets 478 are adjacent to the first ends 470 and second ends 474 of the walls 460 and face toward the axis 42. An aperture 468 is provided in each wall 464 to serve as an outlet for the chamber 466. It is contemplated that more than one aperture 468 may be provided in each wall 464. The function of the catch plate 454 will be described in further detail below.

Figure 9:
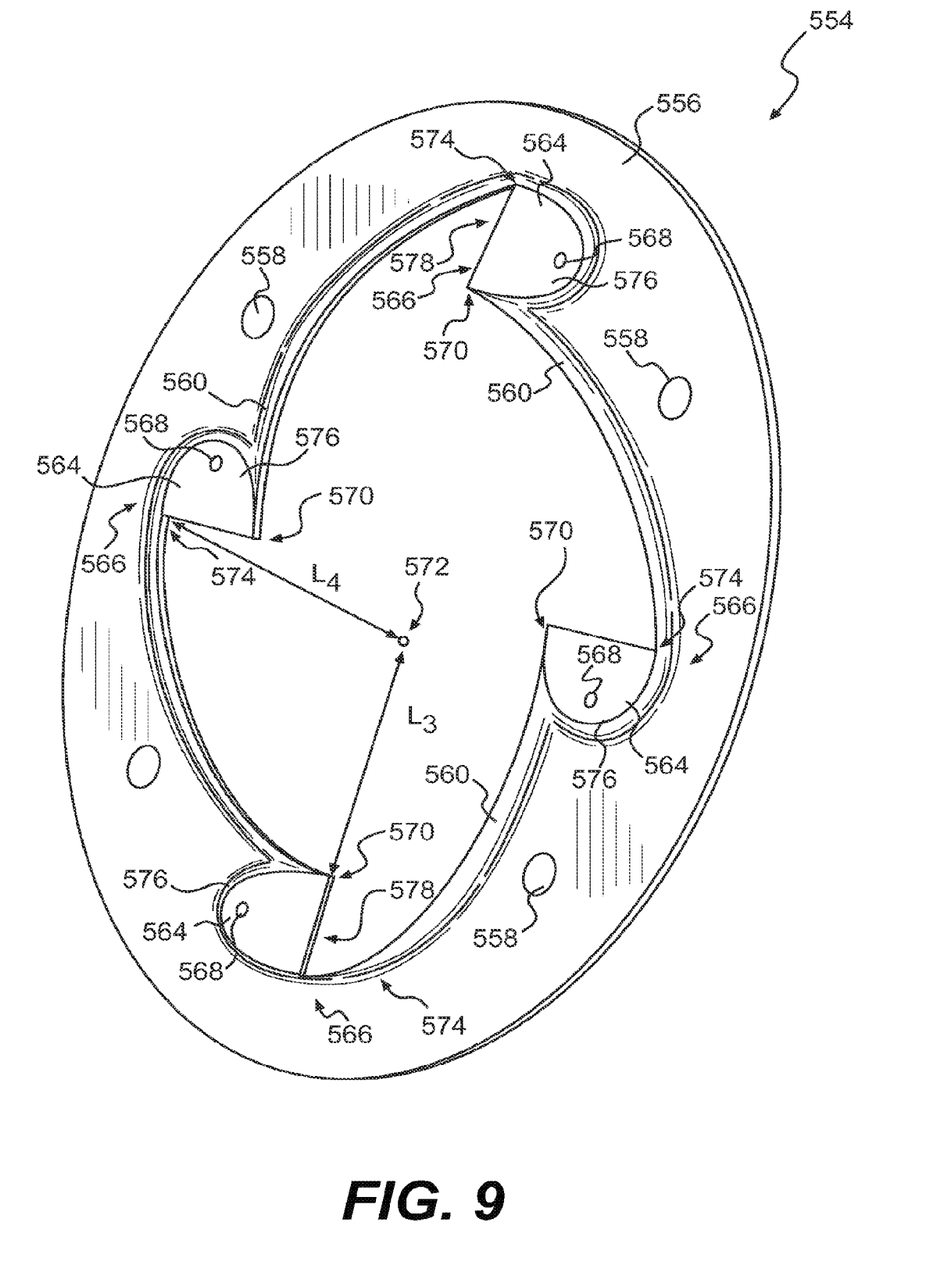
FIG. 9 is an elevation view of a catch plate according to a sixth embodiment of the present invention.

Referring to FIG. 9, the catch plate 554 will now be described according to a sixth embodiment of the present invention. The catch plate 554 is made of stamped sheet metal, and has a planar attachment flange 556 with a plurality of holes 558 formed therein, to allow the catch plate 554 to be mounted to the inside of the circular portion 46 of the rotor body 37 using bolts 57, one of which can be seen in FIG. 2. As can be seen in FIG. 9, the wall 560 extends away from the plane of the attachment flange 56, and also extends away from the circular portion 46 of the rotor body 37 when the catch plate 554 is mounted on the rotor body 37. Four walls 576 cooperate with the walls 564 and the circular portion 46 of the rotor body 37 to define four chambers 566. In the present embodiment, the inlets 578 of the chambers 566 are oriented generally tangentially and not oriented toward the geometric center 572 of the catch plate 554. An aperture 568 is provided in each wall 564. In the present embodiment, the portions of the wall 560 between the chambers 566 have a first end 570 at a first distance L3 from the center 572 and a second end 574 at a second distance L4 from the center 572. The distance L4 is greater than the distance L3. The walls 560 gradually increase in distance from the center 572 between the first end portion 570 and the second end portion 574. This particular shape assists in guiding coolant along the portion of the wall 560 from the first end 570 toward the second end 574 when the coolant is subjected to centrifugal force, as will be described in further detail below. This facilitates the collection of coolant in the chamber 566 adjacent the second end portion 574 when the catch plate 554 spins in the counterlcockwise direction, as will be described in further detail below. An aperture 568 is provided in each wall 564 to serve as an outlet for the chamber 566. It is contemplated that more than one aperture 568 may be provided in each wall 564. The function of the catch plate 554 will be described in further detail below.

The operation of the catch plate 54 to distribute coolant 600 to the stator 38 will now be described, with reference to FIGS. 10 and 11. It should be understood that the catch plates 154, 254, 354, 454 and 554 all operate in a similar manner, and the operation of these embodiments will not be discussed in detail.

Figure 11:
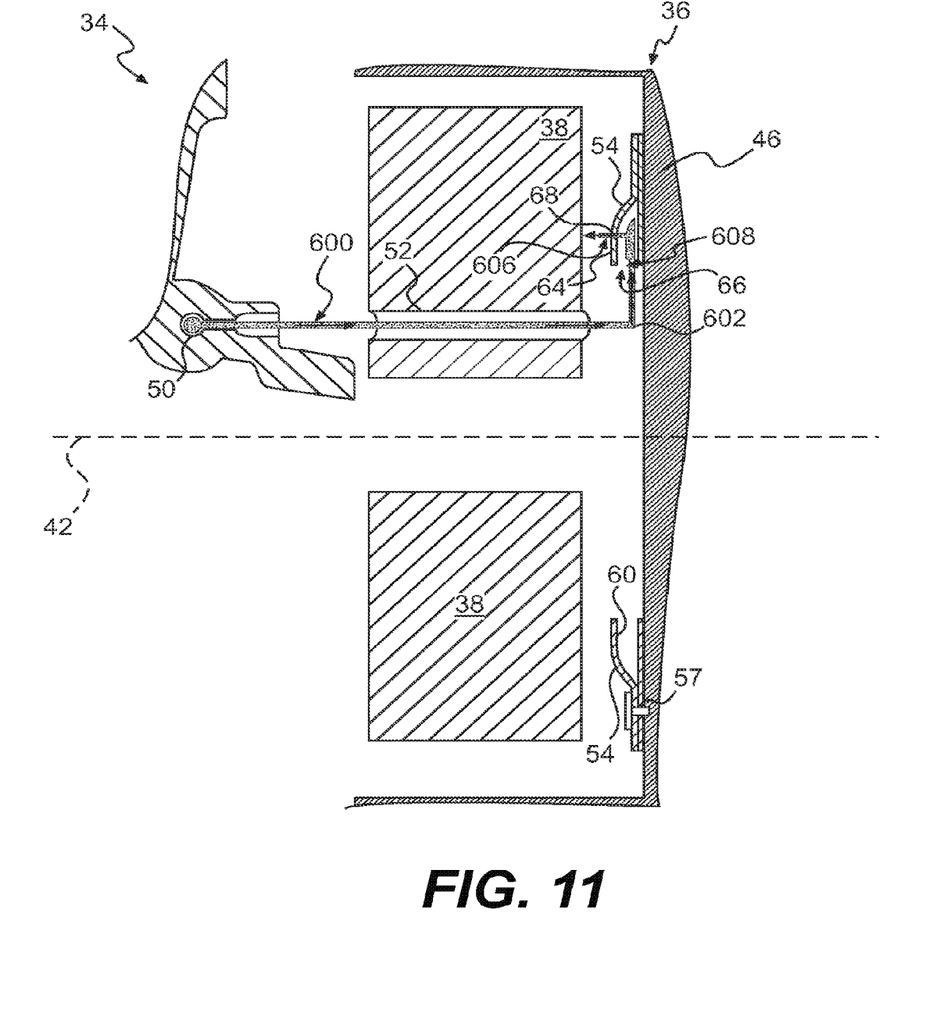
FIG. 11 is a schematic cross-sectional view of the electrical generator of FIG. 2, showing an exemplary flow path of coolant.

Referring to FIG. 11, coolant 600 is delivered to the generator 34 via the passageway 50. The coolant 600 may be supplied to the passageway 50 from the cooling or lubrication system of the engine 10. After the coolant 600 exits the passageway 50, it passes through the stator via the passageway 52. Upon exiting the passageway 52, the coolant 600 reaches the inside face of the circular portion 46 of the rotor body 37, at a point 602 radially outward of the axis of rotation 42 and radially inward of the wall 60.

Figure 10:
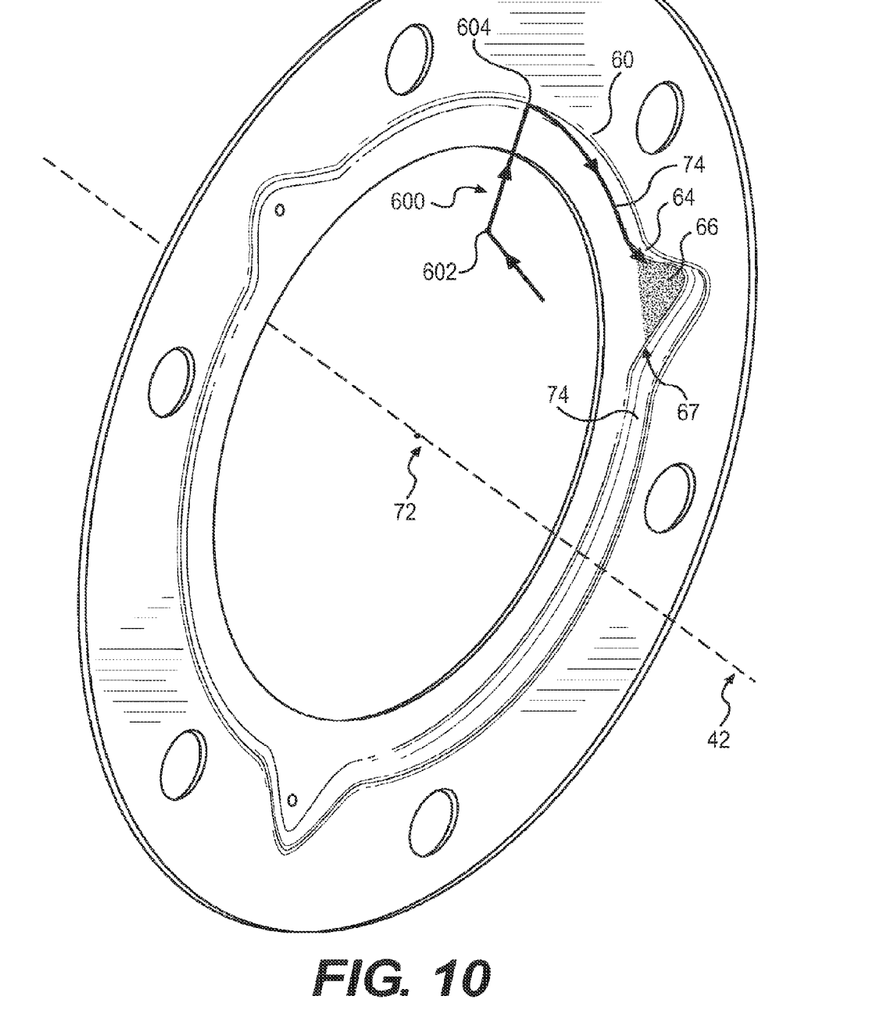
FIG. 10 is a perspective view of the catch plate of FIG. 3, showing an exemplary flow path of coolant.

Referring now to FIGS. 10 and 11, due to the rotational motion of the rotor 36 about the axis 42, the coolant 600 is subjected to a centrifugal force once it contacts the rotor 36 at the point 602. The centrifugal force urges the coolant 600 generally radially outwardly from the geometric center 72 of the catch plate 54, which is located on the axis 42. Referring to FIG. 10, the coolant 600 flows from the point 602 to a point 604 situated along the walls 60 and 62. Because the chamber 66 is disposed radially outwardly of the wall 60, the centrifugal force, in combination with the rotational motion of the rotor 36, cause the coolant 600 to flow along the walls 60 and 62, and further radially outwardly to collect in the chamber 66. In the case of a catch plate 54 having more than one chamber 66, the coolant 600 will flow into all of the chambers 66 as the catch plate 54 rotates. Referring to FIG. 11, the coolant 600 may instead flow radially outwardly from the point 602 directly into the chamber 66, without first flowing along the walls 60 and 62, if the rotational position of the catch plate 54 is such that the axis 42, the point 602 and the chamber 66 are aligned.

Referring to FIGS. 10 and 11, the functioning of the chambers 66 will now be described. Each of the chambers 66 functions in the same way, and only one chamber 66 will be described in detail. As coolant 600 continues to be delivered to the rotor 36 via the passageways 50 and 52, more coolant 600 enters the chamber 66 via the inlet 67. Referring to FIG. 11, this causes the coolant 600 already inside the chamber 66 to be expelled from the chamber 66 via the aperture 68 in the wall 64, in a spray 606 directed generally toward the stator 38. As the rotor 36 continues to rotate about the axis 42, the spray 606 distributes the coolant 600 evenly over the surface of the stator 38.

When the coolant 600 is in contact with the stator 38, the coolant 600 absorbs heat from the stator 38, thereby cooling the stator 38. The coolant 600 may then flow by the force of gravity to the bottom of the chamber in which the generator 34 is located, where the coolant 600 can be collected and circulated through a heat exchanger (not shown) to dissipate heat into the environment. The coolant 600 may then be returned to the passageway 50 to further cool the stator 38.

In one embodiment, the coolant 600 is oil. In this embodiment, the passageway 50 is supplied with oil 600 by the oil pump (not shown) of the engine 10. When the heated oil 600 is collected from the generator 34, it may be circulated through a heat exchanger (not shown), and returned to the oil tank 608 of the engine 10, or any suitable part of the oil circulation system of the engine 10. It is contemplated that the oil 600 collected from the generator 34 may instead be returned directly to the oil tank 608, without passing first through the heat exchanger. The oil 600 is then recirculated by the oil pump to the passageway 50, as well as to other parts of the engine 10.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of cooling a generator having:
   a stator having at least one wire coil, and a rotor body, the rotor body having:
      a circular portion having a first side and a second side opposite the first side; and
      a cylindrical portion coaxial with the circular portion, the cylindrical portion extending from the first side of the circular portion, the circular portion and the cylindrical portion defining a longitudinal axis of the rotor body; and
   the method comprising:
      providing a flow of coolant through the stator;
      supplying the coolant to the first side of the circular portion of the rotor body;
      causing the coolant to move radially along the first side of the circular portion, outwardly from the longitudinal axis;
      collecting the coolant in at least one chamber formed between the first side of the circular portion and at least one first wall, the at least one first wall being disposed between the first side of the circular portion and the stator; and
      expelling the coolant from the at least one chamber generally in the direction of the stator.

2. The method of claim 1, wherein collecting the coolant in at least one chamber comprises collecting the coolant in a plurality of chambers.

3. The method of claim 2, wherein collecting the coolant in at least one chamber comprises collecting the coolant in three chambers.

4. The method of claim 1, wherein the coolant is oil, and wherein providing a flow of coolant through the stator comprises providing a flow of oil through the stator from an oil circulation system of an internal combustion engine.

5. The method of claim 4, further comprising returning the oil to an oil tank of the internal combustion engine.

6. The method of claim 1, wherein causing the coolant to move radially along the first side of the circular portion, outwardly from the longitudinal axis comprises:
   causing the coolant to move radially along the first side of the circular portion, outwardly from the longitudinal axis, to at least one second wall;
   causing the coolant to move generally tangentially along the at least one second wall toward an inlet of the at least one chamber; and
   causing the coolant to move radially outwardly into the at least one chamber.

7. The method of claim 1, wherein expelling the coolant from the at least one chamber generally in the direction of the stator comprises expelling the coolant through an aperture in the at least one first wall.

\* \* \* \* \*